No. 637,141. Patented Nov. 14, 1899.
J. MARX.
BOLT FASTENER.
(Application filed July 10, 1899.)
(No Model.)
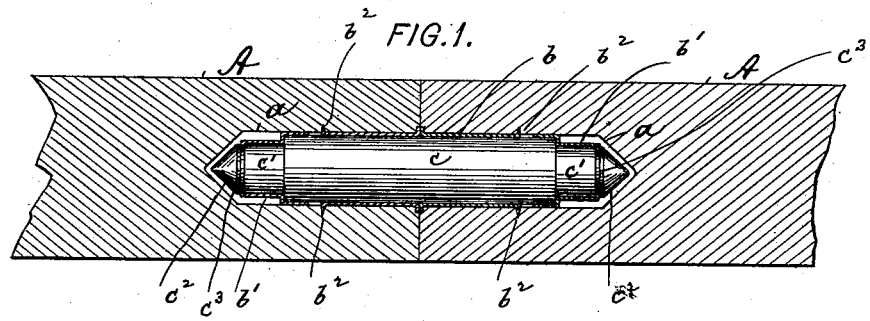
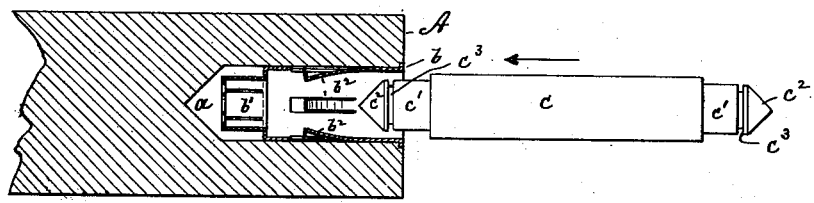
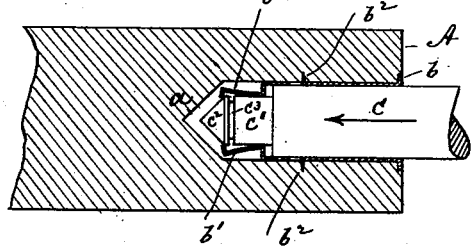
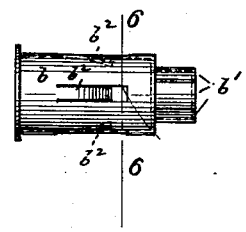
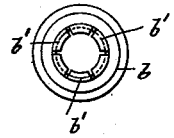
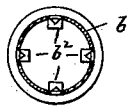
Witnesses:
John Becker.
William Miller.
Inventor:
John Marx
by his attorneys.
Roeder & Briesen

UNITED STATES PATENT OFFICE.

JOHN MARX, OF NEW YORK, N. Y.

BOLT-FASTENER.

SPECIFICATION forming part of Letters Patent No. 637,141, dated November 14, 1899.

Application filed July 10, 1899. Serial No. 723,283. (No model.)

*To all whom it may concern:*

Be it known that I, JOHN MARX, a citizen of the United States, and a resident of New York city, county and State of New York, have invented new and useful Improvements in Bolt-Fasteners, of which the following is a specification.

This invention relates to improved means for locking the end of a bolt within a mortise.

The invention may be employed for uniting two boards end to end by means of a double-headed bolt or for securely locking the end of a bolt, shank, or dowel-pin within its seat in a simple and effective manner.

In the accompanying drawings, Figure 1 is a longitudinal section of the fastener, showing the bolt inserted; Fig. 2, a similar section with the bolt in position to be inserted; Fig. 3, a similar section with the bolt partly inserted; Fig. 4, a side view of the bushing; Fig. 5, an end view thereof; and Fig. 6, a cross-section on line 6 6, Fig. 4.

Within the mortise $a$ of a board or other body A is fitted a cylindrical sheet-metal bushing $b$, (more fully illustrated in Figs. 4, 5, and 6.) At its outer end the bushing is contracted and slitted lengthwise to form a series of spring-arms $b'$, the free ends of which are turned inwardly to form hooks. From the body of the bushing are partly stamped out a series of prongs $b^2$, having outwardly-bent free ends that are adapted to be driven into the wood, and thus lock the bushing to its seat.

The body of the bolt, shank, or dowel-pin $c$ is of a diameter to snugly fit the bushing, while its end $c'$ is contracted to enter between the hooks $b'$. This end, moreover, is provided with a tapering head $c^2$, adapted to spread the hooks, and with a circumferential groove $c^3$, adapted to be permanently engaged thereby.

In use the bushing $b$ is inserted into the mortise $a$, and then the end of the bolt $c$ is inserted into the bushing. The bolt will first crowd the prongs $b^2$ outwardly and cause them to bite into the walls of the mortise, so that the bushing will be locked within its seat. The tapering end $c^2$ of the bolt will then spread the hooks $b'$, Fig. 3, and cause them to spring into the groove $c^3$, Fig. 1, so that the bolt will be locked to the bushing, and consequently to the board A. When the bolt is seated within the bushing, its main body will be in alinement with the prongs $b^2$ to hold them in permanent engagement with the wood, while the reduced end $c'$ will be grasped by the hooks $b'$, that lock the bolt against longitudinal displacement in either direction.

If two boards A are to be united end to end, a double-headed and grooved bolt is used, which projects partly into each of the boards and is connected thereto by the bushing $b$ in the manner described. In this way a simple and very reliable fastening is provided.

What I claim is—

The combination of a bolt having a reduced and grooved end with a bushing having outwardly-projecting prongs which are in alinement with the body of the bolt, and inwardly-turned hooks that engage the grooved end of the bolt, substantially as specified.

JOHN MARX.

Witnesses:
WILLIAM SCHULZ,
F. V. BRIESEN.